Patented July 6, 1937

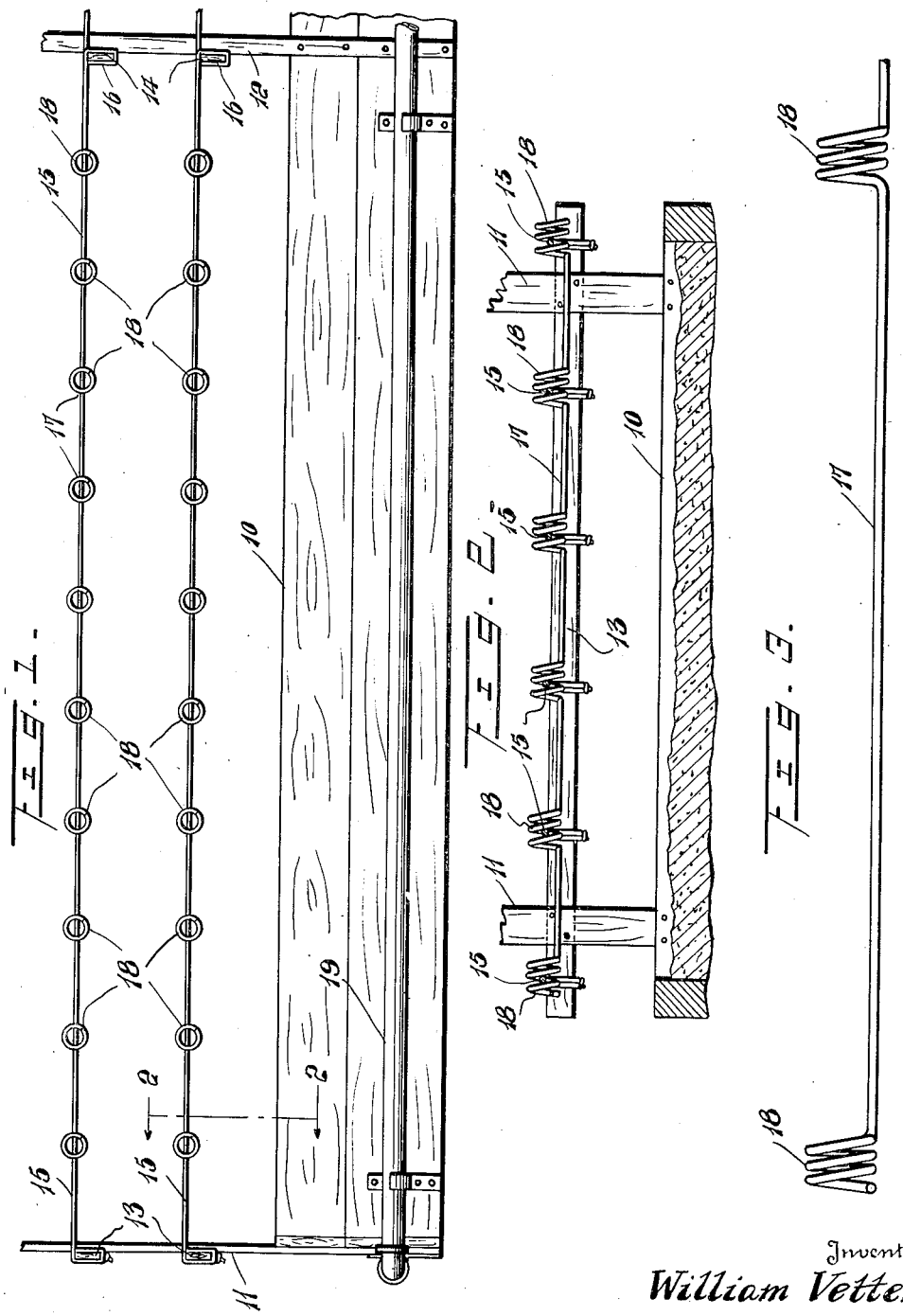

2,086,451

UNITED STATES PATENT OFFICE 2,086,451

GREENHOUSE BENCH TIE

William Vetter, Patchogue, N. Y.

Application January 5, 1937, Serial No. 119,113

4 Claims. (Cl. 47—45)

This invention relates to benches used in greenhouses for propagating plants, and more particularly to the means for supporting the foliage of the plants, and has for its principal object the provision of an improved means for providing such support for the plant foliage.

The invention hereinafter described and shown in the drawing is furthermore an improvement over the present string tie, especially for the growing of carnations, and snapdragons, and all plants that need the necessary support of a tie. Commercial growers will find this improved method economical, and a labor saver.

The principal object of my invention, therefore, is to provide transverse wires or rods having means to engage longitudinally arranged parallel wires or rods of varying gauges and to this end the transverse wires or rods have, at spaced intervals, integral coils that may be readily secured to the parallel wires or rods, this making the invention of practically universal application.

Another object of the invention is the provision of a resilient means for supporting the foliage of plants by providing the transverse wires or rods with the coils as stated.

The invention will be described in detail hereinafter and will be found illustrated in the accompanying drawing in which:

Figure 1 is a fragmentary side elevation of a greenhouse bench and plant supports, showing the improved transverse wires or rods in position thereon;

Figure 2 is a fragmentary transverse section on a plane indicated by the line 2—2 of Figure 1, and Figure 3 is an enlarged detail shown fragmentarily of one of the transverse wires or rods.

In the drawing similar reference characters are used to designate corresponding parts in all of the views.

In the drawing a greenhouse bench designated 10, consists of a receptacle that is adapted to hold earth for the growing of plants, and is provided on its ends with upright posts 11, and at spaced distances along the sides with other posts 12, the posts 11 and 12 being obviously of any height that may be necessary in order to support the foliage of the plants in the receptacle 10.

The posts 11 support horizontal bars 13, and supported on posts 12 are other horizontal bars 14. Secured to the horizontal bars 13 are a plurality of rods or wires 15 that extend longitudinally of the bench or receptacle 10 and are wrapped around the bars 14 as shown at 16.

In order to form frames for the foliage of plants growing in the bench or receptacle 10, the cross tie of wire or rod 17 is provided, and has at its opposite ends a plurality of coils 18, and intermediate of the end coils at spaced distances are other coils 18, said coils being adapted to frictionally engage the longitudinal wires or rods 15 so as to hold them at spaced distances apart and to form therewith rectangular frames to receive and hold the foliage of the plants growing in the bench or receptacle 10 as heretofore stated. It will also be understood that the coils 18 are in part resilient to the connection between the rods 15 and the tie rods 17 so as to provide to a limited degree, a resilient frame for the foliage, as stated.

19 is a conventional steam or hot water pipe for heating the greenhouse in which the bench is installed and also provides a brace for the sides of the bench or receptacle by being mounted on the sides and ends thereof as shown.

It will be apparent that the resilient nature of the coils 18 admit of securing the cross tie 17 to wires or different gauges, so that the tie is capable of practically universal use for the purpose and in fact the cross ties may be used on benches where varying gauged wires are used for the longitudinal wires 15.

I claim as my invention:—

1. In a greenhouse bench, spaced longitudinal rods for supporting plant foliage, and cross rods provided at intervals with resilient means consisting of a plurality of coils integral with the cross rods for selectively engaging said longitudinal rods and providing yielding supports for the foliage aforesaid.

2. In a greenhouse bench, a plant receptacle, spaced longitudinal rods, means for securing said rods spaced above the receptacle, and cross rods provided at intervals with a plurality of integral coils, said coils being adapted to engage said longitudinal rods, said cross rods being spaced from one another and forming, with the longitudinal rods, rectangular frames for supporting plant foliage, and the coils providing yielding means for said frames.

3. A greenhouse bench, comprising in combination with a receptacle for holding earth and growing plants, upright posts at spaced distances and secured to the bench, the posts being arranged in pairs and oppositely disposed, horizontal bars secured to each pair of posts, and spaced from each other, the bars on the several pairs of posts being horizontally alined, rods connecting the horizontally alined bars and extending substantially parallel with one another and spaced from each other, said rods being vertically alined, cross rods, and means removably connecting said cross rods to the first mentioned rods, the cross rods being also vertically alined and providing with the first rods supports for foliage of plants in said receptacle.

4. A greenhouse bench, comprising in combination with a receptacle for holding earth and growing plants, upright posts at spaced distances and secured to the bench, the posts being arranged in pairs and oppositely disposed, horizontal bars secured to each pair of posts, and spaced from each other, the bars on the several pairs of posts being horizontally alined, rods connecting the horizontally alined bars and extending substantially parallel with one another and spaced from each other, said rods being vertically alined, cross rods provided at intervals with a plurality of integral coils engaging said first mentioned rods, the cross rods being also vertically alined and providing the first rods supports for foliage of plants in the receptacle.

WILLIAM VETTER.